United States Patent
Saito et al.

(10) Patent No.: US 8,526,107 B2
(45) Date of Patent: Sep. 3, 2013

(54) METHOD FOR MANUFACTURING ARRAY SUBSTRATE AND ARRAY SUBSTRATE, AND METHOD FOR MANUFACTURING SCREEN AND SCREEN

(75) Inventors: Atsushi Saito, Chino (JP); Kazuo Aoki, Chino (JP); Shintaro Yoshitome, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/445,047

(22) Filed: Apr. 12, 2012

(65) Prior Publication Data

US 2012/0262784 A1    Oct. 18, 2012

(30) Foreign Application Priority Data

Apr. 14, 2011   (JP) ................. 2011-089832

(51) Int. Cl.
  *G03B 21/56*    (2006.01)
(52) U.S. Cl.
  USPC .......................... 359/443; 359/449

(58) Field of Classification Search
  USPC .......................... 359/443; 428/178
  See application file for complete search history.

(56) References Cited

U.S. PATENT DOCUMENTS 8,197,926 B2 *   6/2012  Shinbo et al. ................. 428/178
2002/0041441 A1 *  4/2002  Wang ............................ 359/599

FOREIGN PATENT DOCUMENTS

JP    2001-353777 A    12/2001

* cited by examiner

*Primary Examiner* — Clayton E Laballe
*Assistant Examiner* — Kevin Butler
(74) *Attorney, Agent, or Firm* — ALG Intellectual Property, LLC (57) ABSTRACT

A method for manufacturing an array substrate includes forming a plurality of holes in a film shape substrate having thermal plasticity, in which the holes have a diameter of 0.25 times to 2 times a thickness of the substrate, and a pitch of 5 times to 40 times the diameter of the holes; and heating a molding member provided with a plurality of convex portions or concave portions in an array pattern, pressing the substrate provided with the plurality of holes, and transferring the plurality of convex portions or concave portions to the substrate.

8 Claims, 7 Drawing Sheets

METHOD FOR MANUFACTURING ARRAY SUBSTRATE AND ARRAY SUBSTRATE, AND METHOD FOR MANUFACTURING SCREEN AND SCREEN

The entire disclosure of Japanese Patent Application No. 2011-089832, filed Apr. 14, 2011 is expressly incorporated by reference herein.

BACKGROUND

1. Technical Field

The present invention relates to a method for manufacturing an array substrate and the array substrate, and a method for manufacturing a screen and the screen.

2. Related Art

In the past, an array substrate with a plurality of minute convex or concave portions arranged thereon has been applied to a screen for displaying an image by reflecting projection light emitted from a projection-type display apparatus, such as a projector. Since such an array substrate can be made by use of an imprint molding method (hereinafter, referred to as a transfer molding method), as a method for forming it using resin or the like as a raw material, there is known one for easily forming a screen which displays an image by reflecting the projection light.

In the method for manufacturing the array substrate by use of the transfer molding method, there is a problem in that when resin or the like, which is a raw material of the array substrate, is transferred and molded by use of a molding member having a shape of the array substrate, a gas is collected between the raw material and the molding member, and thus the shape of the bubbles is transferred and formed on the array substrate to be formed by the transfer molding.

JP-A-2001-353777 discloses a press method (transfer molding method) of a resin board in which a concave/convex microstructure has been formed on a surface of a material board (substrate) made of thermoplastic resin in advance, and by using the material board provided with the concave/convex microstructure, a gas existing between a pressing molding and the material board is removed through the concave portions of the concave/convex microstructure.

However, in order to form the concave/convex microstructure on the material board which is the base in advance, there is a problem of needing a molding process of extruding the microstructure and a molding member used for the molding process. In addition, in a case of a film shape base of a thin material, there are problems in that it is difficult to form the concave/convex microstructure through the molding by extruding it in advance, and a preceding process for forming a concave/convex shape through a thermal press or the like is additionally required. The above-described matters are not mentioned in JP-A-2001-353777.

An advantage of some aspects of the invention is to provide a method for forming an array substrate or the like so as to prevent a gas, which is generated between a raw material of a base and the molding member, from being transferred to the array substrate or the like, without carrying out a complicated preceding process for the base, when the array substrate or the like is transferred and molded by use of a molding member.

SUMMARY

The invention can be realized in the following forms or application examples.

APPLICATION EXAMPLE 1

According to an aspect of the invention, there is provided a method for manufacturing an array substrate including: forming a plurality of holes in a film-shaped substrate having thermal plasticity, in which the holes have a diameter of 0.25 times to 2 times a thickness of the substrate, and a pitch of 5 times to 40 times the diameter of the holes; and heating a molding member provided with a plurality of convex portions or concave portions in an array pattern, pressing the substrate provided with the plurality of holes, and transferring the plurality of convex portions or concave portions to the substrate.

According to the method for manufacturing the array substrate, the holes are formed in the base which becomes the film shape substrate having a thermal plasticity in the forming of the holes, thereby suppressing gas or the like generated between the molding member and the base from being collected by discharging the gas or the like through the holes when the heating, pressing and transferring are carried out. Therefore, it is possible to suppress the shape of bubbles from being transferred to the array substrate to be formed, due to the gas or the like generated by the transfer process.

In addition, since the holes formed by the hole forming process have the diameter of 0.25 times to 2 times the thickness of the base provided with the convex portions or the concave portions, the holes can discharge the gas or the like generated in the heating, processing and transferring, and can be blocked by deformation of the base through the heating, processing and transferring. Furthermore, since the interval of the formed holes is set to an interval of 5 times to 40 times the diameter of the holes, the holes can discharge the gas or the like generated by the transfer process, and can be blocked by deformation of the base through the heating, processing and transferring.

APPLICATION EXAMPLE 2

In the method for manufacturing the array substrate according to this application example, it is preferable that in the forming of the holes, the holes with a bar-shaped member having a sharp head are formed by heating at least the bar-shaped member and pressing the substrate, and in the heating, pressing and transferring, the plurality of convex portions or concave portions is transferred on the substrate by preheating the substrate provided with the holes and pressing the substrate.

According to the method for manufacturing an array substrate, in the forming of the holes in the base which becomes a film shape substrate, the bar-shaped member having the sharp head is heated and the substrate is pressed, thereby suppressing burrs of the base from being formed around the formed holes. In addition, since the molding member is pressed from a base surface opposite to the molding member, the burrs can be suppressed from being formed on the base surface, and thus it is possible to increase adhesion between the molding member and the base in the heating, processing and transferring. Furthermore, since extra additives contained in the base can be evaporated by heating the base in advance in the heating, processing and transferring, it is possible to suppress the bubbles from being generated from the additives when the plurality of convex portions or concave portions is transferred by pressing the base.

APPLICATION EXAMPLE 3

It is preferable that an array substrate according to this application example is manufactured by the method for manufacturing an array substrate according to the above-described method for manufacturing the array substrate.

With the array substrate, since the gas or the like generated by the transfer process is suppressed from becoming the bubbles which are formed on the convex portions or concave portions configuring the array substrate, it is possible to obtain the array substrate in which the convex portions or concave portions of a uniform shape are formed and arrayed.

APPLICATION EXAMPLE 4

According to another aspect of the invention, there is provided a method for manufacturing a screen according to this application example includes forming a reflective film for reflecting the projection light on the plurality of convex portions or concave portions formed on the array substrate described above.

With the method for manufacturing the screen, the above-described array substrate is used as the screen base in the screen for reflecting the projection light, and thus the bubbles or the like are suppressed from being transferred to and formed on the convex portions or concave portions formed by the above-described heating, processing and transferring, thereby making the shape of the convex portions or concave portions provided with the reflective film in uniform. Therefore, since unnecessary concave portions are not formed on the base due to the bubbles, it is possible to form the reflective film in line with a region in which the projection light is incident and thus the reflective film is necessary.

APPLICATION EXAMPLE 5

It is preferable that a screen according to this application example is manufactured by the above-described method for manufacturing screen.

With the screen, since the unnecessary concave portions are not formed on the base due to the bubbles, it is possible to form the reflective film in line with the incident of the projection light. Accordingly, it is possible to implement the screen which can be easily viewed by suppressing the projection light from being reflected in a direction other than a desired direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, embodiments will be described with reference to the accompanying drawings. The respective components on the drawings are depicted at a size so as to be sufficiently recognizable, therefore the scale or ratio of the respective components is drawn differently from the actual components in each drawing as appropriate.

First Embodiment

Figure 1A:
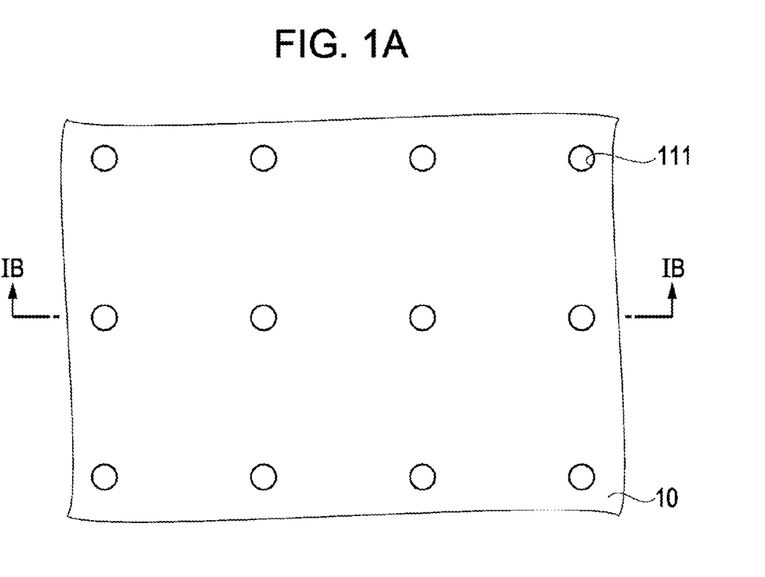
FIGS. 1A and 1B are diagrams illustrating a hole forming process of a base according to a first embodiment.
Figure 1B:
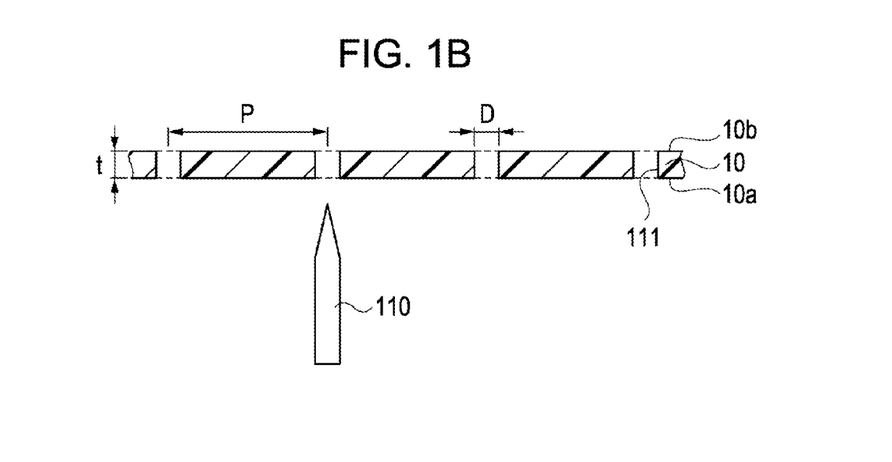

A method for manufacturing an array substrate according to an embodiment, and the array substrate manufactured by the manufacturing method will be described with reference to FIG. 1A to FIG. 4B. FIGS. 1A and 1B are diagrams illustrating a hole forming process of a base such as an array substrate. FIGS. 2A to 3B are diagrams illustrating a transfer process of the base. FIGS. 4A and 4B are diagrams illustrating the array substrate formed by the method for manufacturing the array substrate according to this embodiment.

The method for manufacturing the array substrate according to this embodiment includes a hole forming process 100 and a transfer process 200 in a process order.

As illustrated in FIGS. 1A and 1B, the hole forming process is a process for forming holes 111 in a film shape array base 10, such as an array substrate 1. FIG. 1A is a diagram illustrating the array base 10 formed with the holes 111 by the hole forming process at a planar view, and FIG. 1B is a cross-sectional diagram taken along the line IB-IB of the array base 10 illustrated in FIG. 1A. The hole forming process heats a needle 110 or heats both the array base 10 and the needle 110, and presses the array base 10 with the needle 110, thereby to form the plurality of holes 111, according to this embodiment.

In addition, according to an experiment conducted by the inventor, it leads that if a diameter D of the holes 111 to be formed is set to 0.25 times to 4 times as much as a thickness t of the array base 10, and an interval P between the formed holes 111 is set to 5 times to 10 times as much as the diameter D of the holes, a gas 30 generated between the array base 10 and a molding member 220 which is a mold for the array substrate 1 can be extracted when the transfer process which will be described below is carried out. In addition, the array base 10 according this embodiment uses a vinyl chloride film having a thickness of 0.2 mm, and it is formed to have the diameter D of the holes 0.1 mm and the interval P of 2 mm.

Figure 2A:
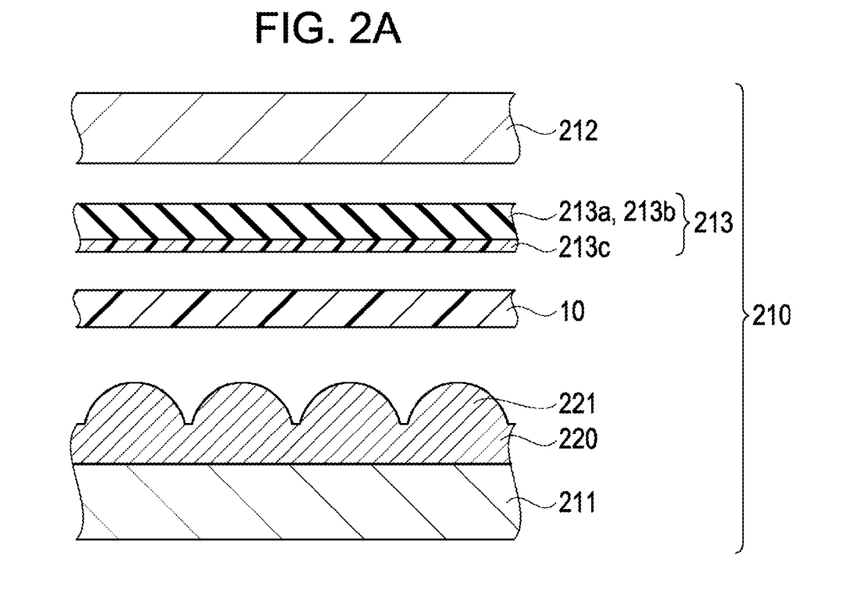
FIGS. 2A and 2B are diagrams illustrating a transfer process of a base according to the first embodiment.
Figure 2B:
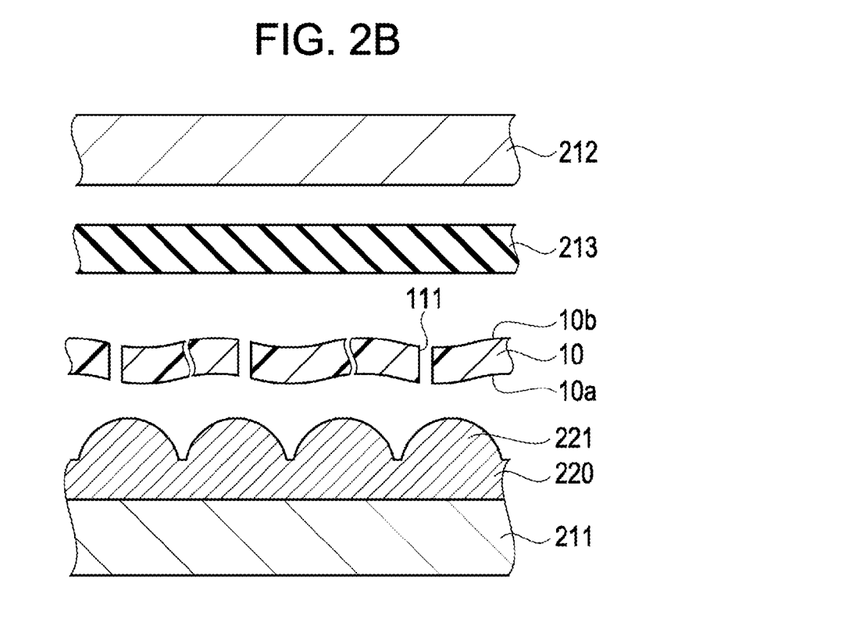
Figure 3A:
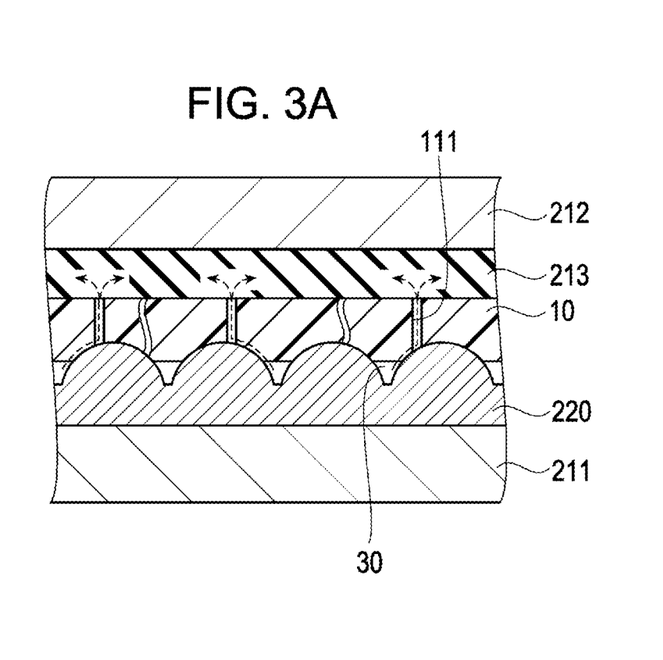
FIGS. 3A and 3B are diagrams illustrating a transfer process of a base according to the first embodiment.

The transfer process illustrated in FIGS. 2A and 2B is a process for deforming the array base 10. The transfer process includes a base feeding and preheating process, a pressing process, and a base removing process. The pressing process in this embodiment deforms the array base 10 to form a plurality of concave portions 1c on a first base surface 10a of the array base 10. In addition, the pressing process is carried out by use of a press transfer device 210 as a transfer device which heats and presses the molding member 220 against the heated array base 10.

FIG. 2A is a cross-sectional view illustrating the configuration of the press transfer device 210 and the array base 10. FIG. 2B is a diagram illustrating the state in which the array base 10 is fed to the press transfer device 210 and the array base 10 is preheated, in the base feeding and preheating process. FIG. 3C and FIG. 3D are cross-sectional views schematically illustrating the state in which the press transfer device 210 operates to form the array base 10. The pressing process will now be described with reference to FIGS. 2A and 2B.

The press transfer device 210 is a device which heats the molding member 220 formed in a shape adverse to the shape to be formed, and presses the array base 10 in a vertical direction at high pressure to thermally deform the array base 10 close to the shape of the molding member 220 and thus transfer and form a desired shape.

As illustrated in FIG. 2A, the press transfer device 210 includes a lower molding base 211 and a molding member 220 provided on an upper portion of the lower molding base 211 and having a convex portion 221 which is formed in a convex shape, below the array base 10. In addition, the press transfer device 210 includes an upper molding base 212 at an upper side of the array base 10.

The array base 10 side of the upper molding base 212 is formed to have a flat surface. In addition, the press transfer device 210 includes a shock-absorbing member 213 between the upper molding base 212 and the array base 10 to uniformly apply pressure to the array base 10 when they are pressed against each other at high pressure.

This embodiment employs the shock-absorbing member 213 assembled with a silicon rubber 213a or a felt member 213b made of an aramid fiber, and a sheet made of Teflon (Trademark) resin 213c on a surface contact with the array base 10. In this embodiment, it is described that the shock-absorbing member 213 utilizes the silicon rubber 213a, unless otherwise specified.

First, the pressing process feeds the array base 10 formed with the holes 111 by the above-described hole forming process to the press transfer device 210. The feeding of the array base 10 is carried out in such a way that the first base surface 10a of the array base 10 faces the molding member 220 and the second base surface 10b faces the shock-absorbing member 213, as illustrated in FIG. 2B. Next, the fed array base 10 is preheated by the heated lower molding base 211 and the upper molding base 212, thereby softening the array base 10 and evaporating extra additives contained in the array base 10. After that, the upper molding base 212 is moved toward the fixed lower molding base 211 to press the array base 10.

When the array base 10 is pressed, as illustrated in FIG. 3A, a gas 30 generated between the array base 10 and the molding member 220 is extracted from the holes 111 formed in the array base 10 to the second base surface 10b side. Thus, the gas 30 generated between the array base 10 and the molding member 220 includes a gas generated by evaporation of the additives or the like contained in the array base 10 by applying the heat to the array base 10, or air existing in a space between the array base 10 and the molding member 220.

In addition, the array base 10 is fed and then is preheated for 180 seconds or more. If the temperature heating the array base 10 is set to 180° C. or more, the holes 111 formed in the array base 10 can be blocked by the pressurization of the press transfer device 210. Furthermore, if the temperature is set to 200° C. or less, the evaporation of the additives contained in the array base 10 is suppressed, so that the pressing process can be carried out in a state in which the quality of the array base 10 is maintained.

At the time of pressurization, since the silicon rubber 213a used as the shock-absorbing member 213 herein has superior air permeability, the gas 30 extracted between the molding member 220 and the array base 10 passes through the silicon rubber and then is discharged. In addition, the silicon rubber 213a has a characteristic that it does not come in close contact with the array base 10 softened by the heat.

Meanwhile, since the felt member 213b and the sheet made of Teflon resin 213c which are used as the shock-absorbing member 213 have the air permeability, the gas 30 out from the molding member 220 and the array base 10 having air permeability penetrates the sheet made of Teflon resin 213c, so that the gas 30 can be discharged from the felt member 213b.

In addition, the sheet made of Teflon resin 213c has the characteristic that the sheet does not come in close contact with the array base 10 softened by the heat, and the durability against the additives evaporated from the array base 10.

Figure 3B:
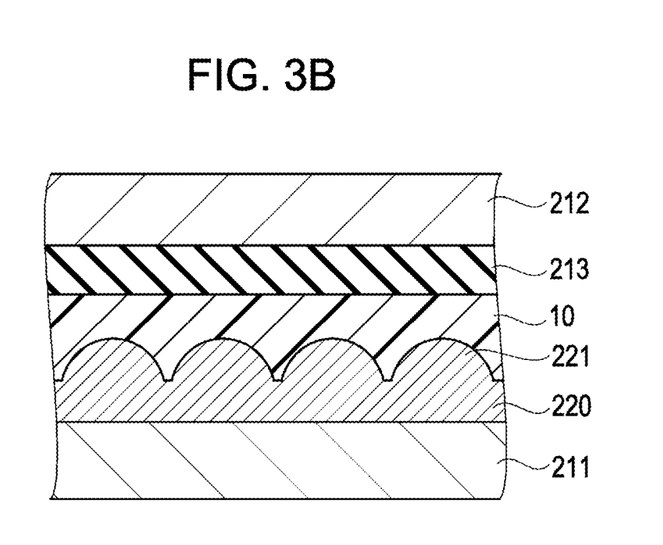
Figure 4A:
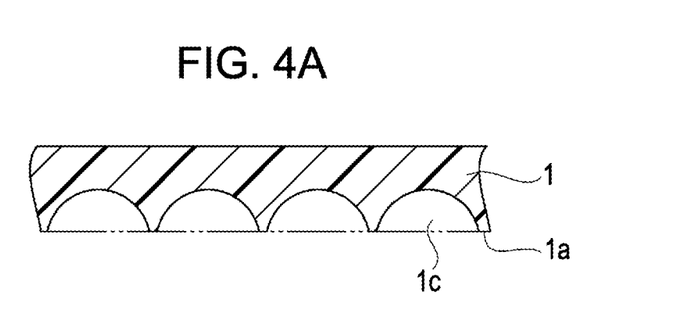
FIGS. 4A and 4B are diagrams illustrating an array substrate formed by a method for manufacturing the array substrate according to the first embodiment.
Figure 4B:
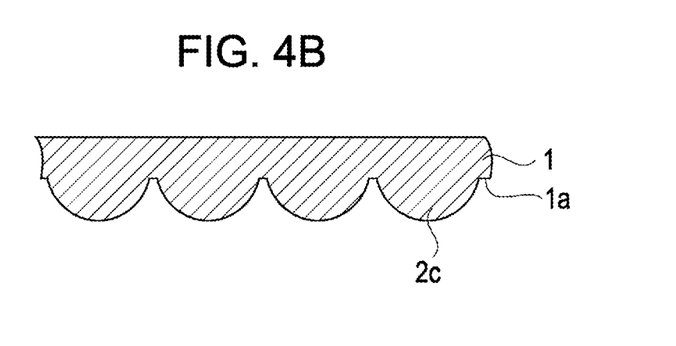

As illustrated in FIG. 3B, the array base 10 is pressed by the lower molding base 211 and the upper molding base 212 which are moved by the press transfer device 210, so that the array base 10 is deformed and thus the gas 30 generated between the molding member 220 and the array base 10 is discharged from the holes 111 formed in the array base 10 to suppress bubbles from being transferred to the formed array substrate 1. By the pressing process, the first b base surface 10a of the array base 10 is deformed along the lines of the convex portions 221 formed on the molding member 220, so that the shape of the molding member 220 is transferred. Although being not illustrated, after the pressing process has been completed, the array base 10 is removed from the press transfer device 210 to a next process by a removing process.

FIGS. 4A and 4B are diagrams illustrating the array substrate 1 formed by the method for manufacturing the array substrate according to the above-described first embodiment. The concave portions 1c formed on the first substrate surface 1a of the array substrate 1 may form convex portions 2c of a convex shape by its specification. In this instance, the molding member 220 has concave portions 222, instead of the convex portions 221, to form the convex portions 2c of the convex shape on the first base surface 10a of the array base 10 by the pressing process in the above-described transfer process.

The array substrate 1 illustrated in FIG. 4A is the array substrate 1 formed by use of the molding member 220 having the convex portions 221. The array substrate 1 is provided with the concave portions 1c of a concave shape according to the shape of the convex portions 221 formed on the molding member 220. In addition, the array substrate 1 illustrated in FIG. 4B is the array substrate 1 formed by use of the molding member 220 having the concave portions (not illustrated). The array substrate 1 is provided with the convex portions 2c of a convex shape according to the shape of the concave portions formed on the molding member 220.

The above-described first embodiment can obtain the following effects.

According to the method for manufacturing the array substrate 1, since the array base 10 formed with the convex portions 2c or the concave portions 1c is provided with the holes 111, so that the gas 30 generated between the molding member 220 and the array base 10 through the transfer process of forming the convex portions 2c and the concave portions 1c, and the gas or the like generated by heating the array base 10 can be discharged. In addition, the diameter D of the holes 111 to be formed is set to be 0.25 times to 2 times as much as the thickness t of the base, and the interval P of the holes 111 to be formed is set to be 5 times to 40 times as much as the diameter D of the holes, so that the holes 111 can be blocked when the molding member 220 is pressed against the array base 10.

This causes the heated array base 10 and the molding member 220 to come in close contact with the each other without forming a space, thereby deforming the array base 10 with the molding member 220. Accordingly, the method for manufacturing the array substrate 1 can be achieved to suppress the bubbles or the like from being transferred to the array substrate 1.

According to the method for manufacturing the array substrate 1, the needles 110 having a sharp head are heated and then are pressed against the array base 10 in the hole forming process of forming the holes 111 in the array base 10, so that it is possible to suppress burrs of the array base 10 from being formed around the holes 111 formed by the pressing. In addition, since the extra additives contained in the base can be evaporated by heating the base in advance in the transfer process, it is possible to suppress the bubbles from being produced from the additives when the plurality of convex portions or concave portions is transferred by pressing the base. Therefore, this increases the adhesion between the array base 10 and the molding member 220, so that the array base 10 is deformed along the lines of the molding member 220 to suppress the bubbles from being transferred to the array substrate 1, thereby achieving the method for manufacturing the array substrate 1.

According to the array substrate 1, since it is possible to suppress the bubbles or the like from being transferred and formed at the time of forming the concave portions 1*c* or the convex portions 2*c* in an array pattern, it can be used as a lens for condensing or scattering light flux transmitting the concave portions 1*c* or the convex portions 2*c* to make a desired light. Therefore, the array substrate 1 is implemented as a lens array and thus is mounted onto a liquid crystal display panel or the like to make a display screen bright in the liquid crystal display panel.

Second Embodiment

This embodiment is a method for manufacturing a screen including a reflective film for reflecting projected light which is manufactured by the method for manufacturing the array substrate described in the first embodiment.

Figure 5:
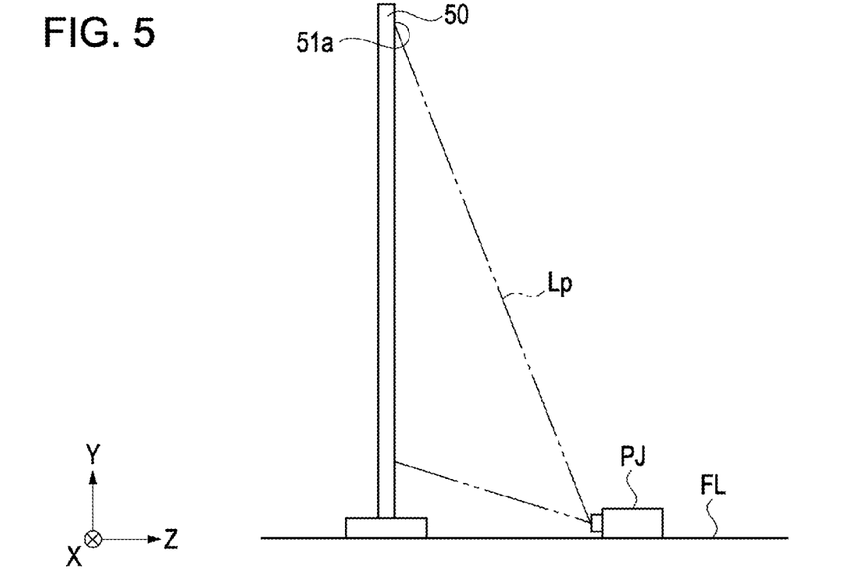
FIG. 5 is a diagram illustrating an installation example of a screen according to a second embodiment.
Figure 6:
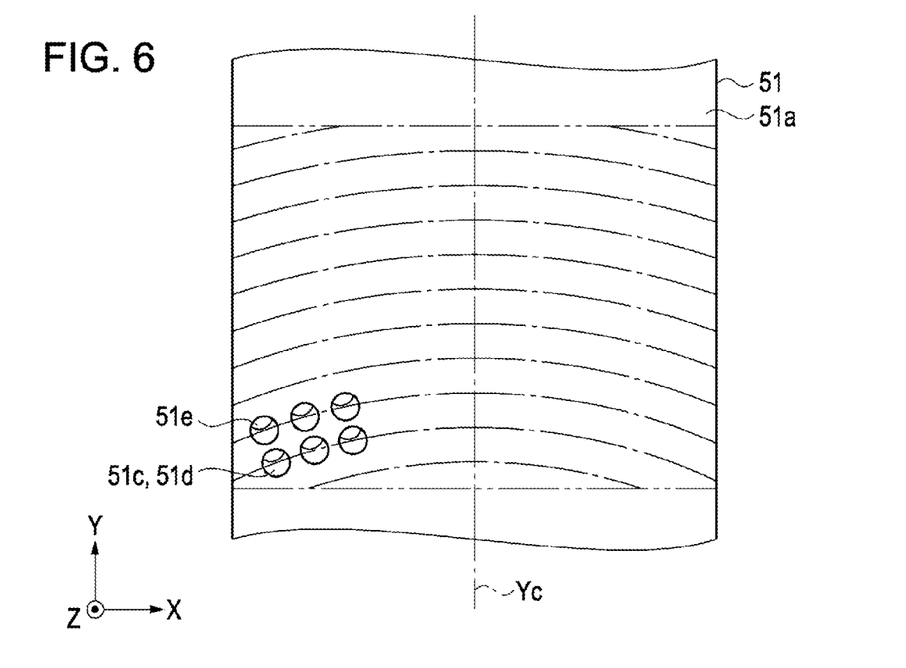
FIG. 6 is a diagram illustrating a surface of a screen base according to the second embodiment.
Figure 7:
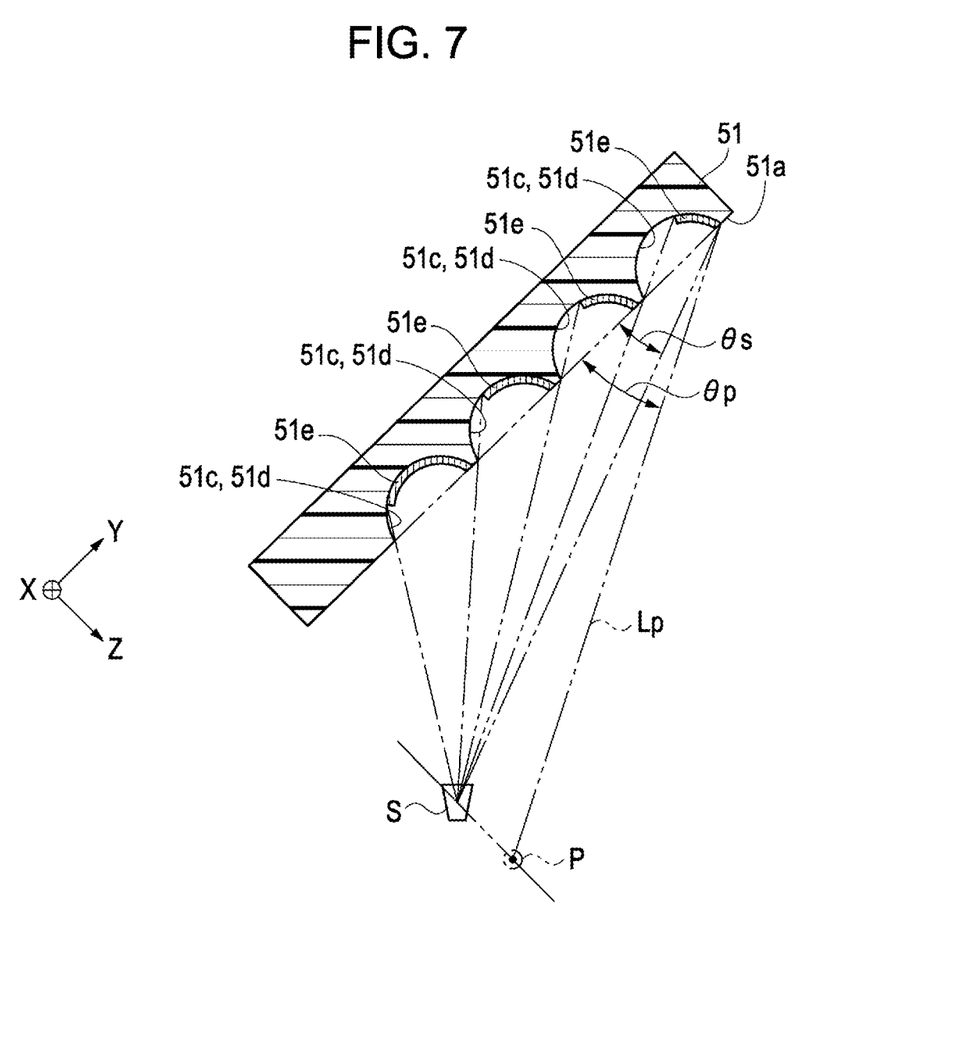
FIG. 7 is a diagram illustrating a process of forming a reflective film of a screen base according to the second embodiment.
Figure 8A:
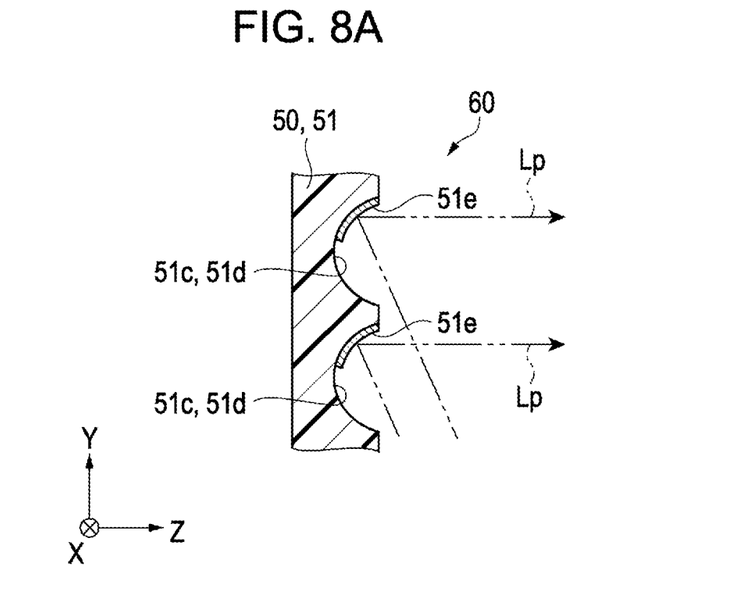
FIGS. 8A and 8B are cross-sectional views schematically illustrating a portion of a surface of a screen according to the second embodiment.
Figure 8B:
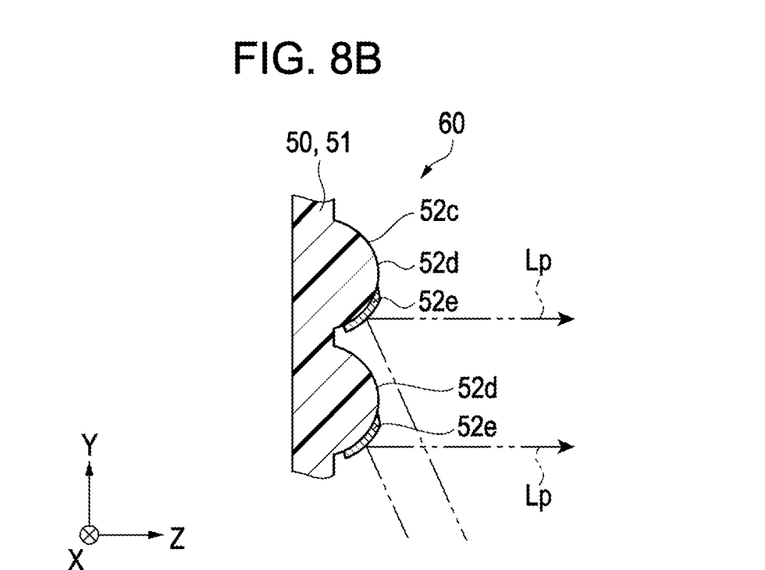

FIG. 5 is a diagram illustrating an installation example of the screen according to this embodiment. FIG. 6 is a diagram illustrating a surface of a screen base manufactured by the method for manufacturing the array substrate described in the first embodiment. FIG. 7 is a diagram illustrating a process of forming a reflective film of the screen according to this embodiment. FIGS. 8A and 8B are cross-sectional views schematically illustrating a portion of the surface of the screen according to this embodiment.

The method for manufacturing the screen according to this embodiment and the screen manufactured by the manufacturing method will now be described with reference to FIGS. 5 to 8B. In FIGS. 5 to 8B, the description utilizes a Cartesian coordinate system in which the Y direction is defined as a direction perpendicular to a floor FL, the X direction is defined as a direction parallel to a first base surface 51*a* of a screen 50 and perpendicular to the Y direction, and the Z direction is defined as a direction perpendicular to the X direction and the Y direction. In addition, as a reference of a gravity acting direction, a direction of falling action is defined as a downward direction, while an opposite direction is defined as an upward direction.

The screen 50 according to this embodiment is a screen 50 for reflecting the projection light Lp emitted from a projection type display apparatus, such as projector PJ, provided on the floor FL in the vicinity of the screen 50 to view the reflected projection light Lp, in the screen base surface 51*a*, as illustrated in FIG. 5.

In the screen base 51, as illustrated in FIG. 6, the first base surface 51*a* which is the surface of the screen base 51 is provided with concave portions 51*c* over approximately the entire region thereof. On the screen base 51, the concave portions 51*c* are arranged in an arc shape on the basis of a predetermined position on a center line Yc of the X direction of the screen base 51, and are arranged in a concentric fashion which is coaxial with the center in the Y direction. The concave portions 51*c* are formed through the transfer process according to the first embodiment. In addition, FIG. 6 is a view illustrating the screen base 51 for one screen.

The method for manufacturing the screen according to this embodiment includes a reflective film forming process. In addition, the screen base 51 according to this embodiment is formed by use of the method for manufacturing the array substrate 1 described in the first embodiment. Furthermore, the method for manufacturing the screen according to this embodiment means a process related to the method for manufacturing the screen through the reflective film forming process.

The reflective film forming process is a process of forming a reflective film 51*e* for selectively reflecting the projection light Lp in an inner surface 51*d* of the concave portions 51*c*. In addition, the reflective film forming process according to this embodiment includes a deposition process of forming the reflective film 51*e* from aluminum through deposition.

The deposition process illustrated in FIG. 7 mounts the screen base 51 onto a depositing device (not illustrated) in such a way that the first base surface 51*a* of the screen base 51 is above a deposition source S and opposed and inclined toward it. In addition, the first base surface 51*a* of the base substrate 51 is mounted in such a way that the upper side, which indicates the y-axis direction, of the screen 50 illustrated in FIG. 5 is away from the deposition source S as compared with the lower side. Furthermore, the deposition source S is installed at the lower side of the screen base 51 on the center line Yc illustrated in FIG. 6.

Returning to FIG. 7, the deposition process will now be described in detail. When the reflective film 51*e* is formed, a position of a projector PJ emitting the projection light Lp at a slant to the first substrate surface 51*a* of the screen base 51 is supposed as an imaginary light source position P in the deposition process. Herein, the deposition source S is positioned in such a way that an angle $\theta s$ of a deposition material with respect to the concave portions 51*c* formed on the first substrate surface 51*a* is less than or equal to an incident angle $\theta p$ of the projection light Lp from the imaginary light source P with respect to each concave portion 51*c* of the first base surface 51*a*, thereby depositing the deposition material on the respective concave portions 51*c* from the incident direction of the projection light Lp.

By carrying out the above-described deposition process, the reflective film 51*e* is formed on the inner surface 51*d* of the concave portion 51*c* along the region emitted to by the projection light Lp. In addition, the deposition is carried out from such a slanted direction to selectively form the reflective film 51*e*, and thus the reflective film 51*e* is partially formed on the respective concave portions 51*c* of the first base surface 51*a* of the screen base 51 in a radial direction around the deposition source S. Although the formation of the reflective film 51*e* is carried out by the deposition method in this embodiment, the reflective film 51*e* may be formed by a spray coating method or a print method.

FIG. 8A is a cross-sectional view schematically illustrating a portion of the screen 50 formed by the above-described manufacturing method of the screen. The formed screen 50 reflects the projection light Lp emitted from the projector PJ to a viewer side (z-axis direction) by the reflective film 51*e* of the concave portions 51*c* formed on the screen 50. In addition, in a case in which unnecessary outside light 60 is incident on the screen 50 from an indoor lamp or the like, the light is absorbed by the concave portions 51*c* except for the reflective film 51*e* to suppress it from reflecting onto the viewer side.

In addition, FIG. 8B is a cross-sectional view schematically illustrating a portion of the screen 50 in which the concave portions 51*c* formed on the screen 50 according to this embodiment is changed by the convex portions 52*c*. The screen 50 illustrated in FIG. 8B is the screen 50 of which the array substrate 1 formed with the convex portions 52c in a convex shape is used as a screen base 51 by replacing the concave portions 51c formed on the first base surface 51a of the screen base 51. It is substantially identical to the above-described screen 50 except that the plurality of convex portions 52c is formed on the first base surface 51a of the screen base 51 and the reflective film 52e is selectively formed on the convex portion 52c.

In addition, the reflective film forming process of forming the reflective film 52e is carried out by the same process and method as the formation of the above-described screen 50 having the concave portions 51c.

The reflective film forming process of forming the reflective film 52e is carried out after the transfer process according to the first embodiment. In the reflective film forming process, the deposition material is deposited from the slanted direction of the screen base 51 through a deposition process 301, like the above-described screen base 51 having the concave portions 51c, thereby selectively forming the reflective film 52e on the outer surface 52d of the convex portion 52c.

The above-described second embodiment can obtain the following effects.

The method for manufacturing the screen 50 utilizes the method for manufacturing the array substrate 1 according to the first embodiment, so that the convex portions 52c or the concave portions 51c for forming the reflective film 51e reflecting the projection light LP can be easily formed by the transfer molding method. Since the bubbles or the like are suppressed from being transferred and formed on the convex portion 52c or the concave portions 51c formed on the screen base 51, it is possible to reduce cases where one sheet of the screen base 51 becomes defective. Accordingly, the yield ratio to manufacture the screen 50 can be improved to form a high quality screen at low cost.

With the screen 50, the bubbles or the like are suppressed from being transferred and formed on the convex portions 52c or the concave portions 51c formed on the screen base 51 through the transfer process. This causes the shape of the convex portions 52c or concave portions 51c formed on the reflective film 52e (51e) to be uniform, so that the reflective film 51e for reflecting the light from the incident direction of the projection light LP is formed in line with the region on which the projection light LP is incident. Accordingly, it is possible to implement a screen which can be easily viewed by suppressing the projection light LP from being reflected in a direction other than a desired direction.

In addition, the invention is not limited to the embodiments described herein. It is to be understood that the invention can be changed or modified in various ways without departing from the scope of the invention. Modification examples will be described below.

MODIFICATION EXAMPLE 1

The array substrate 1 according to the first embodiment is provided with the arranged convex portions 2c or concave portions 1c of a semicircular shape. However, the invention is not limited thereto, and convex portions 2c or concave portions 1c of a polygonal shape may be arranged and formed.

MODIFICATION EXAMPLE 2

The screen 50 according to the second embodiment employs the array substrate 1 provided with the arranged convex portions 52c or concave portions 51c of a semicircular shape. However, the invention is not limited thereto, and a screen may be configured by forming a reflective film with an array substrate provided with arranged convex portions 52c or concave portions 51c of a polygonal shape.

What is claimed is:

1. A method for manufacturing an array substrate comprising:
    forming a plurality of holes in a film-shaped substrate having thermal plasticity such that each of the holes extend completely through the substrate in a thickness direction of the substrate, in which the holes have a diameter of 0.25 times to 2 times a thickness of the substrate, and a pitch of 5 times to 40 times the diameter of the holes; and
    heating a molding member provided with a plurality of convex portions or concave portions in an array pattern, pressing the substrate provided with the plurality of holes, and transferring the plurality of convex portions or concave portions to the substrate.

2. The method for manufacturing the array substrate according to claim 1, wherein in the forming of the holes, the holes with a bar-shaped member having a sharp head are formed by heating at least the bar-shaped member and pressing the substrate, and
    in the heating, pressing and transferring, the plurality of convex portions or concave portions is transferred on the substrate by preheating the substrate provided with the holes and pressing the substrate.

3. An array substrate manufactured by the method for manufacturing an array substrate according to claim 2.

4. A method for manufacturing a screen for reflecting projection light, comprising forming a reflective film for reflecting the projection light onto the plurality of convex portions or concave portions formed on the array substrate according to claim 3.

5. A screen manufactured by the method for manufacturing a screen according to claim 4.

6. An array substrate manufactured by the method for manufacturing an array substrate according to claim 1.

7. A method for manufacturing a screen for reflecting projection light, comprising forming a reflective film for reflecting the projection light onto the plurality of convex portions or concave portions formed on the array substrate according to claim 6.

8. A screen manufactured by the method for manufacturing a screen according to claim 7.

\* \* \* \* \*